United States Patent
Shockley et al.

(10) Patent No.: US 7,988,178 B2
(45) Date of Patent: Aug. 2, 2011

(54) ANTI-BINDING MOTORCYCLE TRAILER HITCH ASSEMBLY

(76) Inventors: Troy Shockley, Greenville, SC (US); Daniel M. Shockley, Liberty, SC (US); James D. Shockley, Greenville, SC (US)

(*) Notice: Subject to any disclaimer, the term of this patent is extended or adjusted under 35 U.S.C. 154(b) by 310 days.

(21) Appl. No.: 12/287,929

(22) Filed: Oct. 15, 2008

(65) Prior Publication Data

US 2009/0102155 A1    Apr. 23, 2009

Related U.S. Application Data

(60) Provisional application No. 60/946,383, filed on Oct. 17, 2007.

(51) Int. Cl.
   *B60D 1/46* (2006.01)
(52) U.S. Cl. .................... 280/447; 280/446.1
(58) Field of Classification Search ............. 280/204, 280/438.1, 446.1, 488, 490.1, 492, 494, 447, 280/467, 456.1, 437, 498; 56/15.9; 172/588
   See application file for complete search history.

(56) References Cited

U.S. PATENT DOCUMENTS

| | | | |
|---|---|---|---|
| 2,221,278 A * | 11/1940 | Utterback | 280/492 |
| 3,848,890 A | 11/1974 | MacAlpine | |
| 3,899,194 A * | 8/1975 | Breford | 280/438.1 |
| 4,548,423 A * | 10/1985 | Craven | 280/492 |
| 4,588,199 A * | 5/1986 | Fisher | 280/204 |
| 4,610,457 A * | 9/1986 | Harmon | 280/204 |
| 6,877,757 B2 * | 4/2005 | Hayworth | 280/438.1 |
| 2009/0008905 A1 * | 1/2009 | Bryce | 280/498 |

FOREIGN PATENT DOCUMENTS

DE    19734088 C1 *  2/1999

* cited by examiner

*Primary Examiner* — Kevin Hurley
*Assistant Examiner* — Daniel Yeagley
(74) *Attorney, Agent, or Firm* — Cort Flint

(57) ABSTRACT

A motorcycle hitch assembly is disclosed for attachment to a hitch support on a motorcycle for towing a trailer. The hitch assembly comprises a base and a pivotal trailer ball carried by the base for being coupled with the trailer coupling. The trailer ball includes a ball element and a ball shank extending from the ball element having a free end. A pivot support connects the base and the ball shaft so that the trailer ball and base pivot relative to each other generally in a vertical plane so that the trailer ball remains generally vertical as the motorcycle and base lean during turning. A clearance space defined between the free end of the shank and a bottom of the base allow the trailer ball to pivot freely in a vertical plane. Binding between the trailer coupler and the trailer ball element is reduced during turning.

13 Claims, 2 Drawing Sheets

ANTI-BINDING MOTORCYCLE TRAILER HITCH ASSEMBLY

BACKGROUND OF THE INVENTION

The invention relates to a motorcycle trailer hitch which reduces the tendency of a trailer hitch coupling to bind when the motorcycle leans in a turn.

The provision of a suitable trailer hitch for attachment to a motorcycle and the like for towing conventional trailers having either two or four wheels is a problem to which considerable attention has been given. Numerous hitches have been devised with which a motorcycle can tow a trailer. Many of these hitches have been merely conventional automobile hitches which are especially adapted for mounting to a motorcycle. Other hitches have been provided having universal couplings that permit pivotal movement about a vertical and horizontal axis. However, these hitches are relatively complicated and often lack a provision to handle any appreciable leaning movement of a motorcycle when turning corners and the like. Other hitches, such as shown in U.S. Pat. No. 4,610,457, have provided a ball bearing swivel assembly for coupling the motorcycle trailer hitch to the motorcycle so that a ball coupling member remains in a generally vertical position regardless of the attitude of the vehicle to accommodate leaning. However, this results in a fairly complicated and expensive structure composed of ball bearings and races.

In a typical ball coupling hitch, the ball is attached to the motorcycle and the coupler socket which receives the ball is attached to a tongue of the trailer. The motorcycle has two longitudinally aligned wheels and the trailer typically has two laterally spaced wheels whose axis is perpendicular to the motorcycle wheels. When turning there is a tendency for the ball element and the coupler socket to bind because the ball and socket coupling only allows for a certain amount of rotation in a universal joint fashion. So, if the motorcycle leans too far a limit is reached and the coupling binds.

Accordingly, an object of the invention is to provide a suitable trailer hitch assembly for hitching a conventional trailer to a motorcycle and the like which accommodates the leaning of the motorcycle during a turn in either direction while towing the trailer.

Another object of the invention is to provide a pivotal ball coupling trailer hitch assembly for a motorcycle and the like which reduces binding in the ball hitch coupling between the motorcycle and trailer during turns.

SUMMARY OF THE INVENTION

The above objectives are accomplished according to the present invention by providing a motorcycle hitch assembly for attachment to a hitch support on a motorcycle for towing a trailer having a trailer tongue with a trailer coupling carried on an end of the tongue. The hitch assembly comprises a base and a pivotal trailer ball carried by the base for being coupled with the trailer coupling. The trailer ball preferably includes a ball element and a ball shank extending from the ball element. A pivot support connects the base and ball shaft so that the trailer ball pivots generally in a vertical plane relative to the base. An elongated mounting shaft is carried by a bottom portion of the base for attachment to the hitch support so that binding between the trailer coupler and the trailer ball element is reduced as the motorcycle leans during turning. Advantageously, the base includes a pair of spaced sides and a bottom wall bridging the two sides. The trailer ball shank is pivotally carried by the two spaced sides and has a free end terminating above the bottom wall of the base. A clearance space is defined between the free end of the shank and the bottom wall of the base allowing the trailer ball and base to pivot relative to each other whereby the trailer ball remains generally vertical. The trailer ball includes an upper body above the pivot support including the ball element and a lower body below the pivot support including the free end.

In accordance with the present invention, the ball element remains generally in a perpendicular position relative to the ground as the motorcycle continues to lean in one direction or the other, reducing the risk of the ball element and the coupler binding when the ball presses against the coupler. The coupler sits on top of the ball element and has the ability to rotate relative to the ball element. The ball element can rotate somewhat in the socket coupler. The pivoting of the ball element to remain vertical, and the slight play in the coupler allows the assembly to accommodate the leaning or turning of the motorcycle.

DESCRIPTION OF THE DRAWINGS

The construction designed to carry out the invention will hereinafter be described, together with other features thereof.

DESCRIPTION OF A PREFERRED EMBODIMENT

Figure 1:
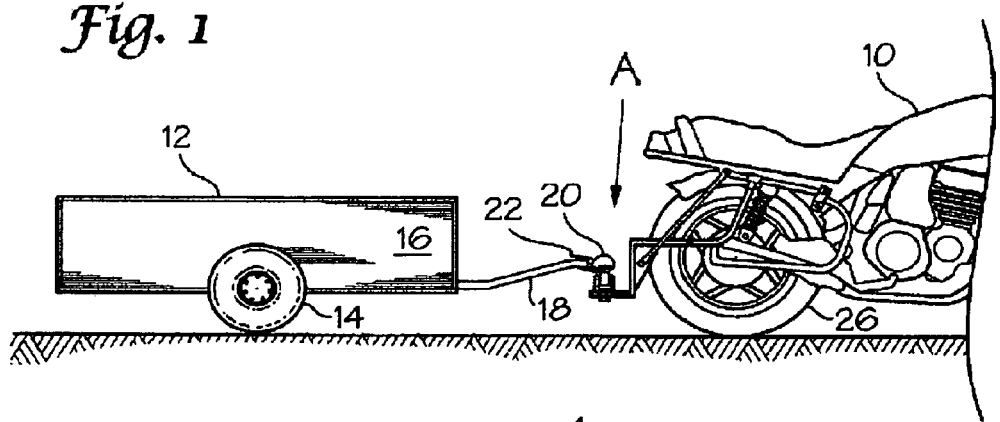
FIG. 1 is a side elevation illustrating a motorcycle towing a trailer using a pivotal trailer hitch assembly according to the invention.

Referring now to the drawings, the invention will now be described in more detail.

FIG. 1 illustrates a motorcycle 10 having a motorcycle trailer hitch assembly A constructed in accordance with the present invention. Also shown for purposes of illustration, is a trailer 12 having a pair of laterally spaced wheels 14 supporting a trailer body 16. Extending from the trailer body is a trailer tongue 18 having a trailer coupler 20 carried at the end thereof. Trailer ball coupler 20 is a conventional coupler having a releasable lock controlled by a lever 22 and locking elements 24 carried within the coupler, and is well known in the art.

Motorcycle 10 includes two wheels 26 carried in tandem. The rotational axis of the wheels is perpendicular to the fixed axles of the trailer wheels 14.

Figure 2:
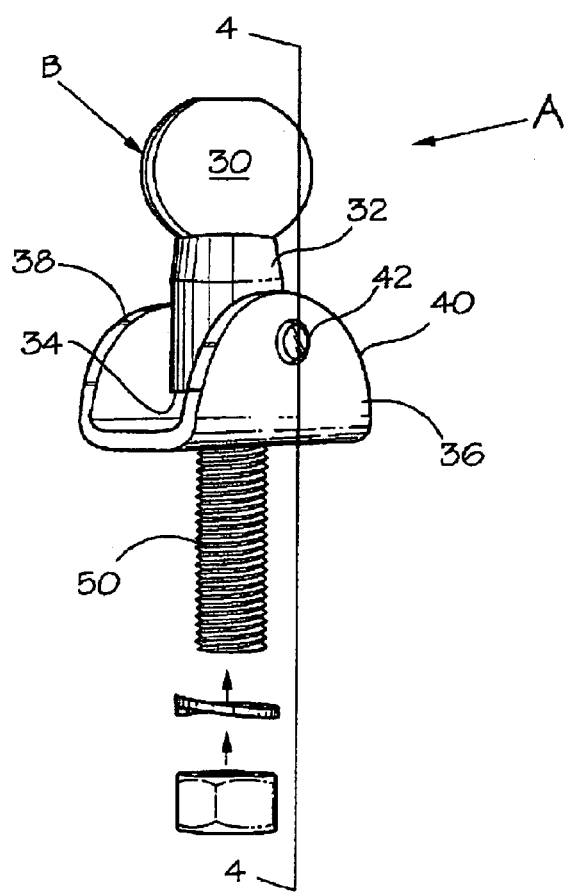
FIG. 2 is a left hand prospective view of a pivotal motorcycle trailer hitch assembly constructed according to the invention.

In accordance with the present invention, a trailer ball hitch assembly A is provided which reduces the binding between the coupler and the trailer ball. As can best be seen in FIGS. 2 and 3, the trailer ball hitch assembly includes a trailer ball B having an upper ball element 30 and a lower shank 32 terminating in a free end 34. Trailer ball element 30, of course, will be sized according to conventional trailer ball diameters.

Trailer ball B is pivotally carried by a base 36 having a pair of spaced sidewalls 38 and 40 between which a pivot support C is carried. In the illustrated embodiment, pivot support C includes a pivot shaft 42 extending through a pivot bearing or bore 44 formed in the trailer ball shank. Preferably the pivot shaft is carried in openings 38a and 36a of sidewalls 38 and 40 and maintained by means of lock washers 46. Base 36 includes a bottom wall 48 extending between sidewalls 36 and 40. Trailer ball B includes an upper body 55 above pivot shaft 42 and a lower body 50 below pivot shaft 42. Upper body 48 has a height greater than that of lower body 50 to accommodate hitching and pivoting.

Figure 4:
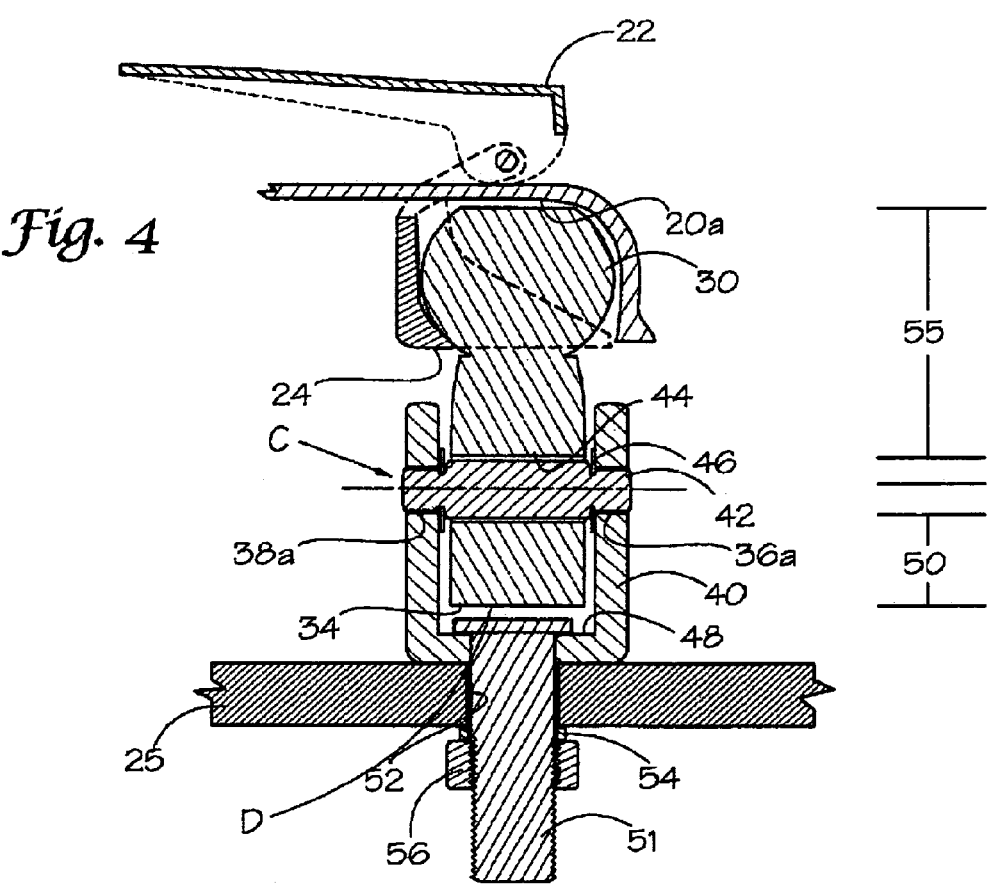
FIG. 4 is a sectional view taken along line 4-4 of FIG. 3.

As can best be seen in FIG. 4, a clear space D is defined between free end 34 of the trailer ball shank which terminates short of the bottom wall so that base 36 and trailer ball B may pivot relative to each other. In this manner, trailer ball B pivots to remain generally vertical or erect as motorcycle 10 and base 36, affixed therewith, turn as the motorcycle leans during turning whereby binding is reduced.

Figure 3:
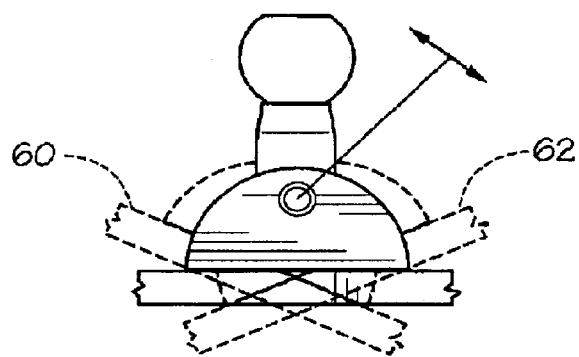
FIG. 3 is a front elevation illustrating a pivotal motorcycle trailer assembly mounted to a motorcycle hitch support according to the invention showing rotation of the base during left and right turning while the ball element remains erect.

Secured to a bottom portion of the base is a mounting shaft 51 having threads which extend through an opening 52 in the hitch support 25 whereupon the mounting shaft may be affixed by means of a lock washer 54 and nut 56. Thus it can be seen that a simple yet effective trailer ball hitch assembly can be had for a motorcycle in order to tow a trailer with little, if any, binding during turning. As illustrated in FIG. 3, trailer ball B remains generally erect as base 36 pivots left or right during motorcycle turning without binding between the coupler and ball element. As is typical in a conventional trailer ball hitch, there is additional play between the coupler socket 20a and the ball element 30 which, together with the pivoting of the base to the left position or the right position 60 and 62, in FIG. 3, binding free turns may be had.

While a preferred embodiment of the invention has been described using specific terms, such description is for illustrative purposes only, and it is to be understood that changes and variations may be made without departing from the spirit or scope of the following claims.

What is claimed is:

1. A motorcycle hitch assembly for attachment to a hitch support on a motorcycle for towing a trailer having a trailer tongue with a trailer coupling carried on an end of the tongue, said hitch assembly comprising; a base; a pivotal trailer ball carried by said base for being coupled; with said trailer coupling; said trailer ball including a ball element and a ball shank extending from said ball element; a pivot support connecting said base and said ball shank so that said trailer ball and base pivot relative to each other generally in a vertical plane generally transverse to said motorcycle and said trailer ball remains generally vertical as said motorcycle and base lean during turning; and an attachment member securing said trailer ball and hitch support; whereby binding between the trailer coupling and the trailer ball element is reduced during turning, wherein said base includes a pair of spaced sides and a bottom wall bridging said two sides; said trailer ball shank being pivotally carried by said two spaced sides and having a free end terminating above said bottom wall of said base.

2. The assembly of claim 1 including a clearance space defined between said free end of said shank and said bottom wall of said base allowing said trailer ball to pivot freely generally in a vertical plane about either side of a generally vertical axis.

3. The assembly of claim 2 wherein said trailer ball includes a upper body length about said pivot support including said ball element and a lower body length below said pivot support including said free end.

4. The assembly of claim 3 wherein said pivot support includes a pivot pin carried by said sidewalls of said base and said trailer ball shank.

5. The apparatus of claim 4 including a mounting shaft carried by said base having threads for receiving a nut to attach said base to said hitch support.

6. The apparatus of claim 1 wherein said attachment member includes an elongated mounting shaft carried by a bottom portion of said base for attachment to said hitch support.

7. A motorcycle hitch assembly for attachment to a hitch support on a motorcycle for towing a trailer having a trailer tongue with a trailer coupling carried on an end of the tongue, said hitch assembly comprising; a base; a pivotal trailer ball carried by said base for being coupled with said trailer coupling; said trailer ball including a ball element and a ball shank extending from said ball element terminating in a free end; a pivot support connecting said base and said ball shank so that said trailer ball and base pivot relative to each other generally in a vertical plane generally transverse to said motorcycle so that said trailer ball remains generally vertical as said motorcycle and base lean during turning; a clearance space defined between said free end of said shank and a bottom wall of said base allowing said trailer ball to pivot freely generally in a vertical plane; and an attachment member securing said trailer ball and hitch support; whereby binding between the trailer coupling and the trailer ball element is reduced as the motorcycle leans during turning.

8. The assembly of claim 7 wherein said base includes a pair of spaced sides and said bottom wall bridging said two sides; said trailer ball shank being pivotally carried by said two spaced sides and said free end terminating above said bottom wall of said base.

9. The assembly of claim 8 wherein said trailer ball includes a upper body above said pivot support including said ball element and a lower body below said pivot support including said free end.

10. The assembly of claim 9 wherein said upper body has a height greater that the height of said lower body.

11. The assembly of claim 9 wherein said pivot support includes a pivot shaft carried by said sidewalls of said base and said trailer ball shank.

12. The apparatus of claim 11 including a mounting shaft carried by said base having threads for receiving a nut to attach said base to said hitch support.

13. The apparatus of claim 7 wherein said attachment member includes an elongated mounting shaft carried by a bottom portion of said base for attachment to said hitch support.

* * * * *